United States Patent
Tene et al.

(10) Patent No.: US 6,928,463 B1
(45) Date of Patent: Aug. 9, 2005

(54) BROADBAND CONTENT DELIVERY VIA PERSONAL CONTENT TUNNEL

(75) Inventors: Gil Tene, San Carlos, CA (US); Bryan Gleeson, Cupertino, CA (US); Shyam Pillalamarri, Los Altos Hils, CA (US); Reinaldo Penno Filho, Santa Clara, CA (US); Simon Bryden, La Roquette sur Siagne (FR)

(73) Assignee: Nortel Networks Limited, St. Laurent (CA)

( * ) Notice: Subject to any disclaimer, the term of this patent is extended or adjusted under 35 U.S.C. 154(b) by 783 days.

(21) Appl. No.: 09/982,677

(22) Filed: Oct. 18, 2001

Related U.S. Application Data
(60) Provisional application No. 60/303,419, filed on Jul. 6, 2001.

(51) Int. Cl.[7] .............................................. G06F 15/16
(52) U.S. Cl. ........................ 709/203; 709/220; 709/222; 370/356; 713/201; 707/10
(58) Field of Search ................................. 709/203, 220, 709/222, 227; 370/356, 392; 713/201; 707/10

(56) References Cited

U.S. PATENT DOCUMENTS

| | | | | |
|---|---|---|---|---|
| 6,182,141 B1 | * | 1/2001 | Blum et al. | 709/227 |
| 6,731,630 B1 | * | 5/2004 | Schuster et al. | 370/356 |
| 2002/0027915 A1 | * | 3/2002 | Foti et al. | 370/392 |
| 2002/0065906 A1 | * | 5/2002 | Davidson et al. | 709/222 |
| 2002/0184301 A1 | * | 12/2002 | Parent | 709/203 |
| 2004/0110670 A1 | * | 6/2004 | Arico et al. | 514/12 |
| 2004/0143579 A1 | * | 7/2004 | Nakazawa | 707/10 |
| 2005/0010816 A1 | * | 1/2005 | Yu et al. | 713/201 |

OTHER PUBLICATIONS

Gil Tene, BCDF Infrastructure Working Group, Jul. 11, 2000. pp. 1–10,BCDF Boston Meeting, Jul. 10–11, 2000.

* cited by examiner

Primary Examiner—Hosain Alam
Assistant Examiner—Liang-che Wang
(74) Attorney, Agent, or Firm—Blakely Sokoloff Taylor & Zafman

(57) ABSTRACT

In one embodiment of the invention, browser plug-in includes a personal content tunnel (PCT) object processor, a PCT resolution module, and a server interface. The PCT object processor processes a PCT object returned by a content server in response to a request from a client. The PCT object contains PCT information. The PCT resolution module resolves a service uniform resource identifier (URI) using the PCT information according to a PCT resolution protocol. The service URI identifies a PCT resolution server. The server interface receives a content URI and a PCT termination point resolved by the PCT resolution server.

23 Claims, 6 Drawing Sheets

BROADBAND CONTENT DELIVERY VIA PERSONAL CONTENT TUNNEL

RELATED APPLICATION

This patent application claims the benefit of U.S. Provisional Application No. 60/303,419 filed on Jul. 6, 2001.

BACKGROUND

1. Field of the Invention

This invention relates to computer networks. In particular, the invention relates to content delivery.

2. Description of Related Art

The popularity of the Internet has created many opportunities to provide services or contents to users. Users now can have easy access to a large number of service providers to receive services, products, or advertisements. Examples of these services include video conferencing, online gaming, digital book downloading, video and audio programming, etc.

However, existing services to deliver contents to clients or subscribers have a number of drawbacks. First, the content or service delivered is typically performed on a narrow band basis. Second, clients do not receive premium services tailored according to their preferences, choices, and budget. Third, the delivery of contents is typically based on an unpredictable best effort standard. Fourth, the content providers do not have control of how their content is delivered.

Therefore, there is a need in the technology to provide an efficient technique for content delivery via broadband networks.

SUMMARY

In one embodiment of the invention, browser plug-in includes a personal content tunnel (PCT) object processor, a PCT resolution module, and a server interface. The PCT object processor processes a PCT object returned by a content server in response to a request from a client. The PCT object contains PCT information. The PCT resolution module resolves a service uniform resource identifier (URI) using the PCT information according to a PCT resolution protocol. The service URI identifies a PCT resolution server. The server interface receives a content URI and a PCT termination point resolved by the PCT resolution server.

According to one embodiment of the present invention, the PCT information includes at least one of a carrier type identifier, a PCT routing control parameter, a PCT session time-out parameter, a bandwidth parameter, an authentication parameter, and the service URI. The PCT object processor includes a PCT object receiver to receive the PCT object via a Hypertext Transfer Protocol (HTTP) link, and a PCT object interpreter to interpret the received PCT object. The plug-in further includes a session initiator. The session initiator initiates a content delivery session between the client and a local node using a carrier tunnel identified by the carrier type identifier. The local node provides access to content delivered from the content server. The local node may be a local content host, a broadband service node, or a second broadband service node and a local content host. The second broadband service node connects to a local content host caching the content or the content server via a content server tunnel.

An embodiment of the invention may provide at least one of the following benefits (1) increasing customer's satisfaction for services, (2) providing content providers better means to control content delivery, (3) increasing customer's accessibility to worldwide services, (4) maintaining subscriber loyalty, and (5) improving commercial transactions between wholesale service providers and retail services providers.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The features and advantages of the present invention will become apparent from the following detailed description of the present invention in which.

DESCRIPTION

Figure 1:
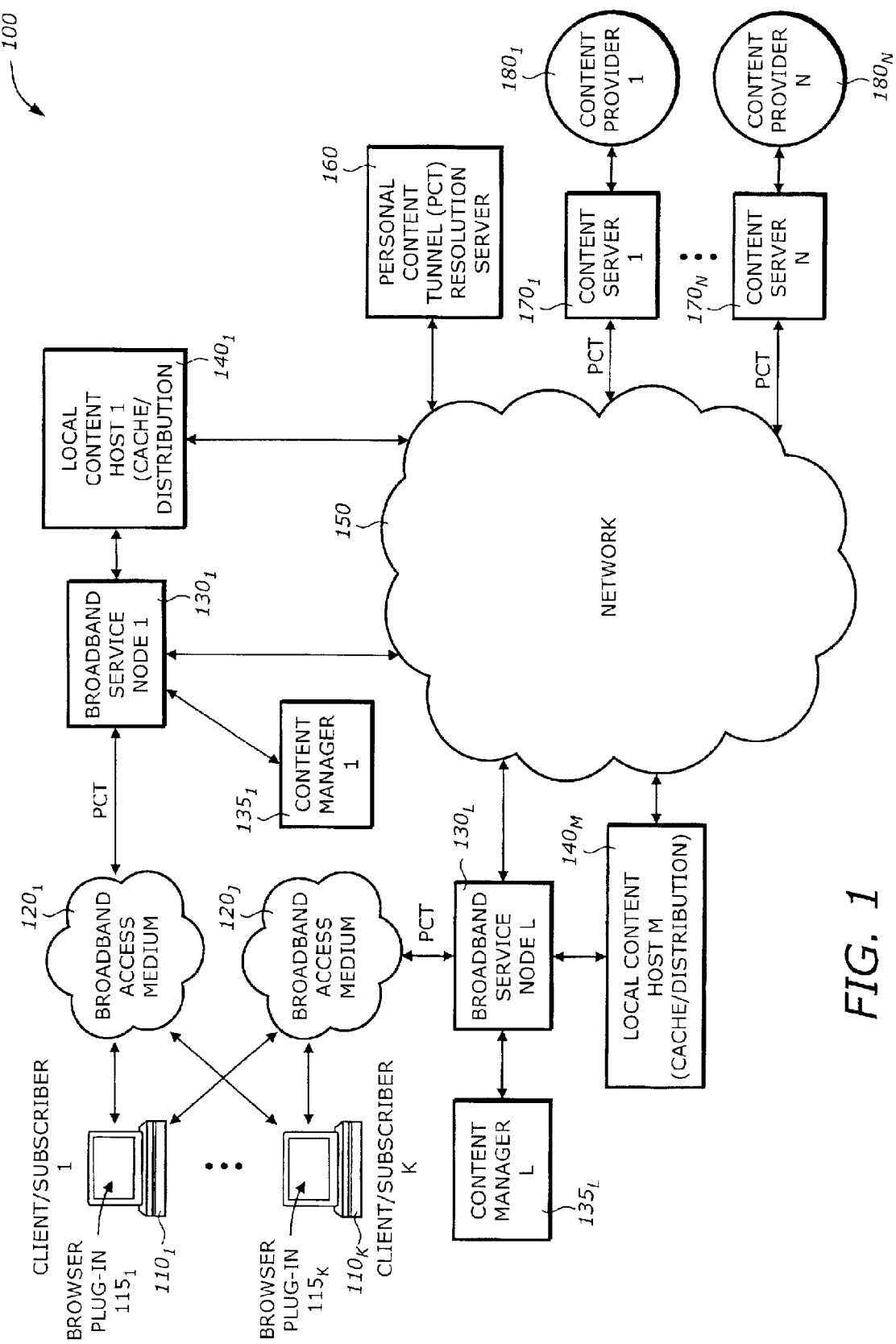
FIG. 1 is a diagram illustrating a system in which one embodiment of the invention can be practiced.

The present invention is a method and apparatus to provide personal content delivery to a client or subscriber. The content is a program, or service, that can be transmitted and delivered over a network. Examples of the content include a movie, a video and/or audio program, a musical performance, a sequence of images, graphics, audio segments, a textual page, a book, a literal work, a visual artwork, etc. The content is delivered according to personalized criteria, requirements, or profiles. The client/subscriber subscribes to the services offered by a content provider or a service provider. The client/subscriber may pay for the premium services.

The personal content delivery is based on a Personal Content Tunnel (PCT) mechanism. A PCT is intended for use by client software (e.g., Web browsers) to establish an individual, focused delivery channel. Such a channel may be used to deliver content requiring custom traffic parameters (e.g., high bandwidth, low latency, or a preferred forwarding path). Dynamically created sessions can establish such traffic parameters, and remain active for the duration needed by the delivered content.

Local Exchange Carriers (LEC's), Internet Service Providers (ISP's), and content providers can all benefit from such PCT capability. By placing the content sources close to the edge of the network, and allowing PCT termination directly at the subscriber edge of the network, LEC's or ISP's can deliver high quality, controlled broadband content that would bypass their normal Internet peering links. Such capability is useful for both the access provider and the content source, as typical Internet peering links provide relatively low bandwidth at a high cost, and travel via less controllable congestion paths.

In the following description, for purposes of explanation, numerous details are set forth in order to provide a thorough understanding of the present invention. However, it will be apparent to one skilled in the art that these specific details are not required in order to practice the present invention. For example, specific details are not provided as to whether the method is implemented in a station as a software routine, hardware circuit, firmware, or a combination thereof.

Embodiments of the invention may be represented as a software product stored on a machine-readable medium (also referred to as a computer-readable medium, a processor-readable medium, or a computer usable medium having a computer readable program code embodied therein). The machine-readable medium may be any type of magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium. Software running from the machine readable medium may interface with circuitry to perform the described tasks. Hardware and software structures may be coupled in a number of interfaces. A software module may be coupled to another software module by passing parameters, sharing common memory blocks, and exchanging variables or messages.

FIG. 1 is a diagram illustrating a system 100 in which one embodiment of the invention can be practiced. The system 100 includes K clients/subscribers $110_1$ to $110_K$, J broadband access media $120_1$ to $120_J$, L broadband service nodes (BSN's) $130_1$ to $130_L$, L content managers $135_1$ to $135_L$, M local content hosts $140_1$ to $140_M$, a network 150, a personal content tunnel (PCT) resolution server 160, and N content servers $170_1$ to $170_N$. In the following, the subscript may be dropped for clarity.

The client/subscriber 110 may have several meanings depending on the context. In one context, the client/subscriber 110 is an application for personal content delivery that runs on a computer, a workstation, a mobile device, a hand-held computer, a personal digital assistant (PDA). In another context, the client/subscriber may refer to the physical device or system (e.g., a computer, a workstation) that has the application program for content delivery session. Yet, in another context, the client/subscriber 110 may refer to a person, an account, an entity, a business, a fictitious name, a residence, a group of people, etc. who subscribes to the personal content delivery service.

Each of the K clients/subscribers $110_1$ to $110_K$ typically has a browser or a software program to allow a user to view Web pages and navigate through the Web. The K clients/subscribers $110_1$ to $110_K$ have respective K browser plug-ins $115_1$ to $115_K$. Each of the K browser plug-ins $115_1$ to $115_K$ is a software or hardware module or any combination of hardware and software that adds a specific feature or service to the browser. The specific feature or service is the personal content delivery that allows the corresponding client/subscriber to receive a personalized content delivered according to some predefined protocol.

Each of the J broadband access media $120_1$ to $120_J$ represents a broadband carrier to transmit the content at high speed with high quality of service (QoS). Examples of the broadband access medium include Digital Subscriber Loop (DSL), time division multiplexing (TDM), wholesale dial, cable, cable modem, high-speed modem, wireless, frame relay/asynchronous transfer mode (FR/ATM). Each of the J broadband access media $120_1$ to $120_J$ may include an access switch that interfaces to a number of clients/subscribers and route to the broadband service node 130.

The broadband service node (BSN) 130 is a subsystem located at the edge of the network 150 to help a content provider or service provider to aggregate a large number of subscribers and centrally provision them with highly customized network services, including personal content delivery. The BSN 130 interfaces to the broadband access medium 120 and the network 150 to provide controlled content delivery to a client/subscriber via a premium channel and medium while utilizing the existing network communication systems such as the Internet.

The content manager 135 is associated with the BSN 130 to manage a personal content delivery session. The content manager 135 may include a graphical user interface (GUI) to allow intelligent interactive session between the client/subscriber and the content provider. The content manager 135 may include a service creation system that creates services personalized to the subscribers. The content manager 135 may also include or interface to application programs for billing, accounting, service subscription, content selection, content rating, advertisements, and any other content management tasks.

The local content host 140 is a subsystem that stores the contents delivered by the content provider and distributes this content to the subscribers. The local content host 140 may be a server, a database workstation, or a high speed cache unit. The local content host 140 is connected to the BSN 130 and the network 150 to transfer the content received from the content provider via the network 150 to the client/subscriber via the BSN 130.

The network 150 represents any network for data and media (e.g., video/audio) transmission and communication. The network 150 may be a wide area network (WAN), a local area network (LAN), the Internet, an intranet, a network backbone, an Internet Protocol (IP) ethernet, an IP ATM, a virtual private network (VPN), a tunnel, an IP Security (IPSec), etc.

The content servers $170_1$ to $170_N$ communication with the subscribers 110 via PCT's. The PCT is a tunnel over which content is provided, and is established and terminated in a session driven manner. A PCT is carried over individual Point-to-Point Protocol (PPP) sessions. These PPP sessions are carried over tunneling technologies or over multi dialing technologies. Examples of tunneled technologies include Layer Two Tunneling Protocol (L2TP), Point-to-Point Tunneling Protocol (PPTP), and the Layer 2 Forwarding Protocol (L2F) all over IP, and PPP over Ethernet (PPPoE) over bridge segments. Examples of multi dialing technologies include Integrated Services Digital Networks (ISDN) and PPP over ATM (PPPoA) over Switched Virtual Connections (SVC's).

The PCT resolution server 160 is a server connected to the network 150 that perform PCT service resolution using a PCT protocol to be described later. The PCT resolution server 160 is accessed by a link to a predefined uniform resource identifier (URI) via a Hypertext Transfer Protocol (HTTP).

The N content servers $170_1$ to $170_N$ are servers that are associated with N content providers $180_1$ to $180_N$, respectively. Each of the N content servers $170_1$ to $170_N$ is involved in the establishment of a content delivery session with a requesting client/subscriber 10. Each of the N content servers $170_1$ to $170_N$ may transfer the content to a local content host before or during a content delivery session.

Alternatively, each of the N content servers $170_1$ to $170_N$ may also be connected to the client/subscriber via a tunnel particular to the content provider. In this case, a tunneling switch may be necessary to switch the PCT to the content provider tunnel at a service node. The content providers $180_1$ to $180_N$ may be any service providers that can provide content to be delivered to a subscriber. The content providers $180_1$ to $180_N$ may be a movie distributor, a bookstore, a music distributor, etc.

Figure 2:
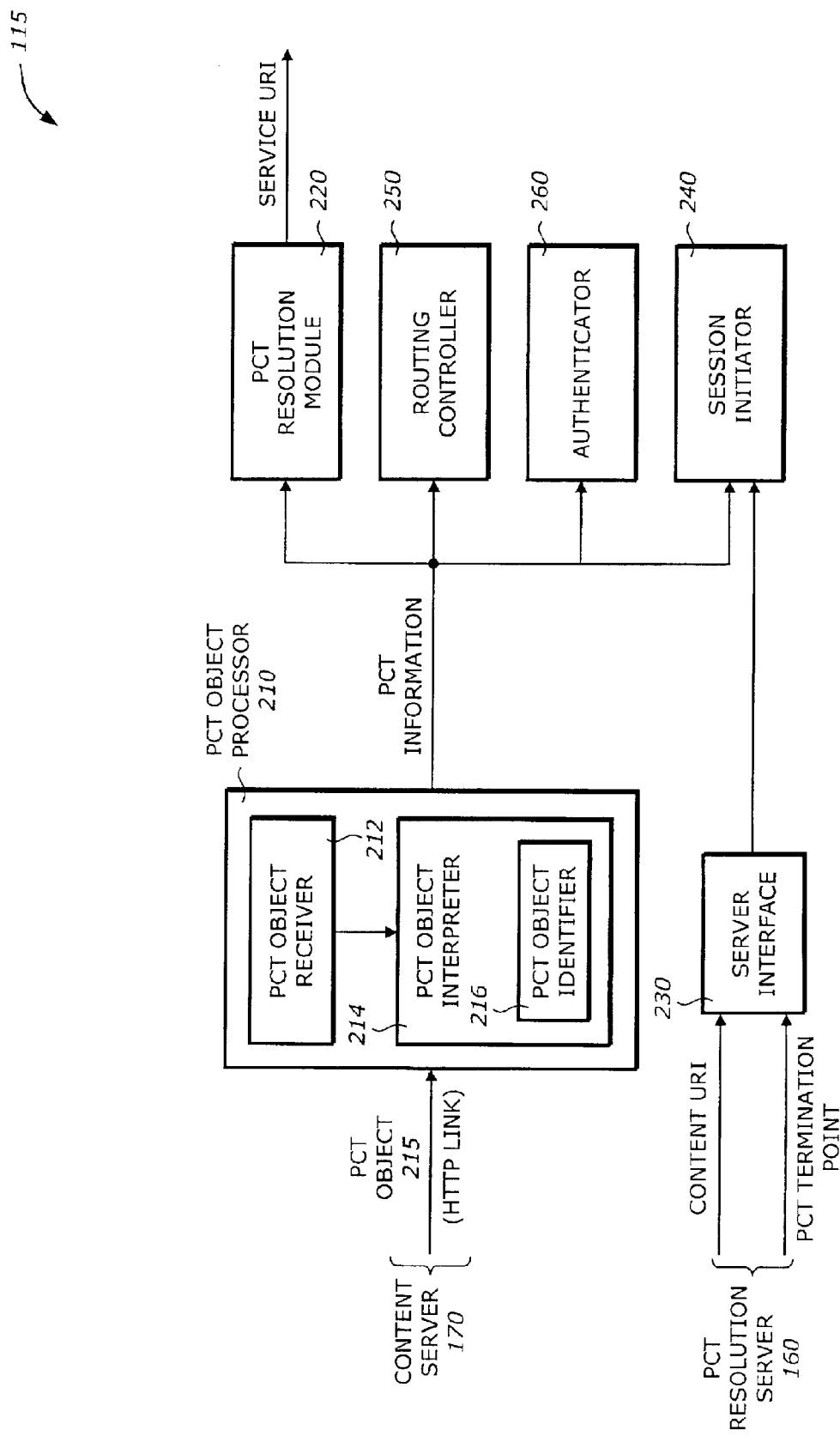
FIG. 2 is a diagram illustrating a browser plug-in according to one embodiment of the invention.

FIG. 2 is a diagram illustrating a browser plug-in 115 according to one embodiment of the invention. The browser plug-in 115 includes a PCT object processor 210, a PCT resolution module 220, a server interface 230, a session initiator 240, a routing controller 250, and an authenticator 260. Each of these elements may be separate or integrated into one or more modules, functions, or routines.

The PCT object processor 210 processes a PCT object (PCTO) 215 returned by the content server 170 in response to a request from the client/subscriber 10. The PCTO contains PCT information needed to establish a PCT. The PCT information may contain one or more of the following: a carrier type identifier, a PCT routing control parameter, a PCT session time-out parameter, a bandwidth parameter, an authentication parameter, and a service URI. The carrier type identifier specifies the type of carrier used for the delivery session. The PCT routing control parameter specifies the routing information such as the mask for the subnet containing the Internet Protocol (IP) address of the content server. The authentication parameter is a parameter used for authentication purposes. This parameter may be a username or user identifier, a password, a realm, or a domain. The PCT object 205 can be pointed to by a typical URI and retrieved using common protocols. In one embodiment, the PCT object 205 is embedded in HTTP content and is retrieved via HTTP. The PCT object processor 210 includes a PCT object receiver 212 and a PCT object interpreter 214. The PCT object receiver 212 retrieves the PCT object 205 via HTTP. The PCT object interpreter 214 interprets the received PCT object 205. The PCT object interpreter 214 includes a PCT object identifier 216. The PCT object identifier 216 identifies the PCT object based on a unique encoding type. In one embodiment, the unique encoding type is the Multipurpose Internet Mail Extensions (MIME).

The PCT resolution module 220 resolves a service uniform resource identifier (URI) using the PCT information contained in the PCT object 205 according to a PCT resolution protocol. The service URI identifies the PCT resolution server 160 (FIG. 1).

The server interface 230 receives a content URI and a PCT termination point resolved by the PCT resolution server 160. The server interface 230 then passes the content URI and the PCT termination point to the session initiator 240 to initiate a personal content delivery session. The content URI identifies the source for the content.

The session initiator 240 initiates a content delivery session between the client/subscriber 110 and a local node using a carrier tunnel identified by the carrier type identifier. The carrier tunnel uses a tunneling protocol which may be one of a point-to-point protocol (PPP)/layer two tunneling protocol (L2TP) or a PPP/point-to-point tunneling protocol (PPTP) as discussed before. The local node provides access to content delivered from the content server 170 (FIG. 1). There may be several scenarios in which the content is delivered to the client/subscriber 110. These scenarios are described in FIGS. 3A, 3B, and 3C. Depending on the scenario, the local node represents a local content host, a second broadband service node and a local content host, or a second broadband service node with a tunnel connection to the content server 170. As discussed earlier, the local content host caches the content and distributes the content to the requesting client/subscriber.

The routing controller 250 establishes a route for the subnet containing the Internet Protocol (IP) address of the content server, to be used for the content delivery session. The subnet is identified by a network mask in the PCT routing control parameter.

The authenticator 260 authenticates the client/subscriber using the authentication parameter. Typically more than one authentication parameter is used. These parameters may include a username, a user's password, a realm, and a domain. If the client/subscriber cannot be authenticated (e.g., incorrect password), the content delivery request may be declined.

To support a personal content delivery session, a PCT resolution protocol is used. The PCT resolution protocol uses User Datagram Protocol (UDP) over a well known port. It uses a text-based, single request-response sequence for resolution.

Figure 3A:
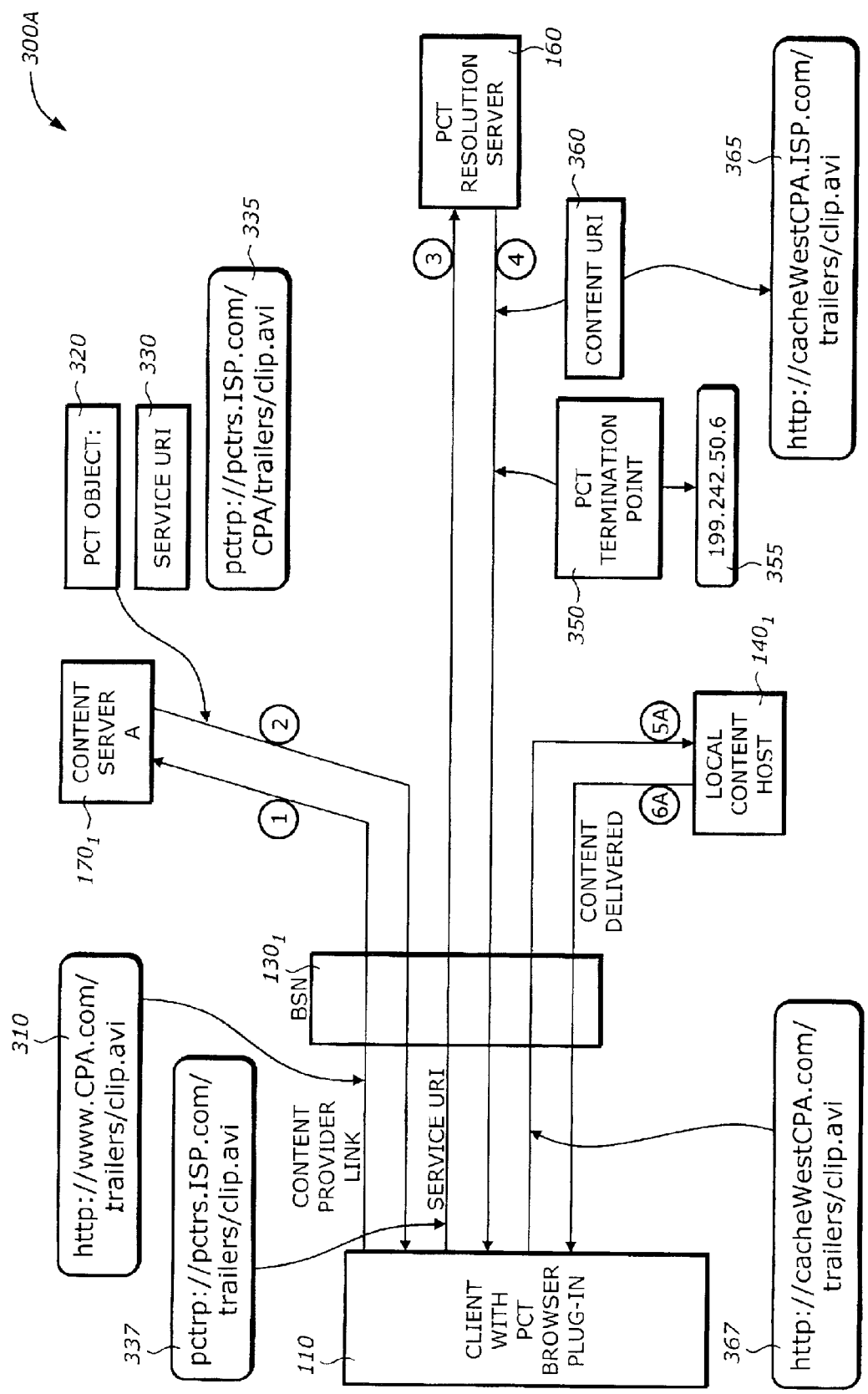
FIG. 3A is a diagram illustrating a PCT protocol for a redirection according to one embodiment of the invention.

FIG. 3A is a diagram illustrating a PCT protocol for redirection to a content cache according to one embodiment of the invention. In this PCT protocol, the system includes the client 110 with a PCT browser plug-in, the BSN $130_1$, the local content host $140_1$, the content server A $170_1$, and the PCT resolution server 160.

The PCT protocol takes place in six steps:

Step 1: The client 110 sends a request to the content server $170_1$ via the BSN $130_1$. This request is typically performed by a content server link 310 to the content server $170_1$. For example, the content server link 310 may be:

http://www.CPA.com/trailers/clip.avi

Step 2: The content server 170, returns the PCT object 320 to the client 110 via the BSN $130_1$. The PCT object 320 contains PCT information. The PCT information includes a service URI 330. An example of the service URI 330 is a URI 335:

pctrp://pctrs.ISP.com/CPA/trailers/clip.avi

Step 3: The client 110 sends a request to the PCT resolution server that includes a client request identifier (ID), a PCT carrier identifier, a client identifier, and a PCT service URI 335. The client 10 obtains the PCT service URI 335 from the received the PCT object 320 and uses the PCT service URI 337 which is the same as the service URI 335. The service URI 337 identifies the PCT resolution server 160.

RESOLVE<Client request ID><PCT carrier ID><Client ID><service URI>

Example

RESOLVE 54321 PPTP 199.242.48.30 pctrp://pctrs.ISP.com/CPA/trailers/clip.avi

Step 4: The PCT resolution server 160 responds by sending a PCT termination point 350 and a content URI 360 to the client. An example of the PCT termination point is 355 and an example of the content URI is the URI 365.

RESOLVED<Client request ID><PCT carrier ID><PCT Termination Point><Content URI>

UNRESOLVED<Client request ID>

Examples

RESOLVED 54321 PPTP 199.242.50.6 http://cacheWestCPA.ISP.com/trailers/clip.avi

Step 5A: The client 110 obtains the content URI 360 and uses it as a URI 367 to access the local content host $140_1$ via the BSN $130_1$. In the above example, the content URI 367 is:

http://cacheWestCPA.ISP.com/trailers/clip.avi

Step 6A: The local content host 140₁ stores the content to be delivered. Upon being requested, the local content host 140₁ delivers the stored content to the requesting client 110 via the BSN 130₁.

Figure 3B:
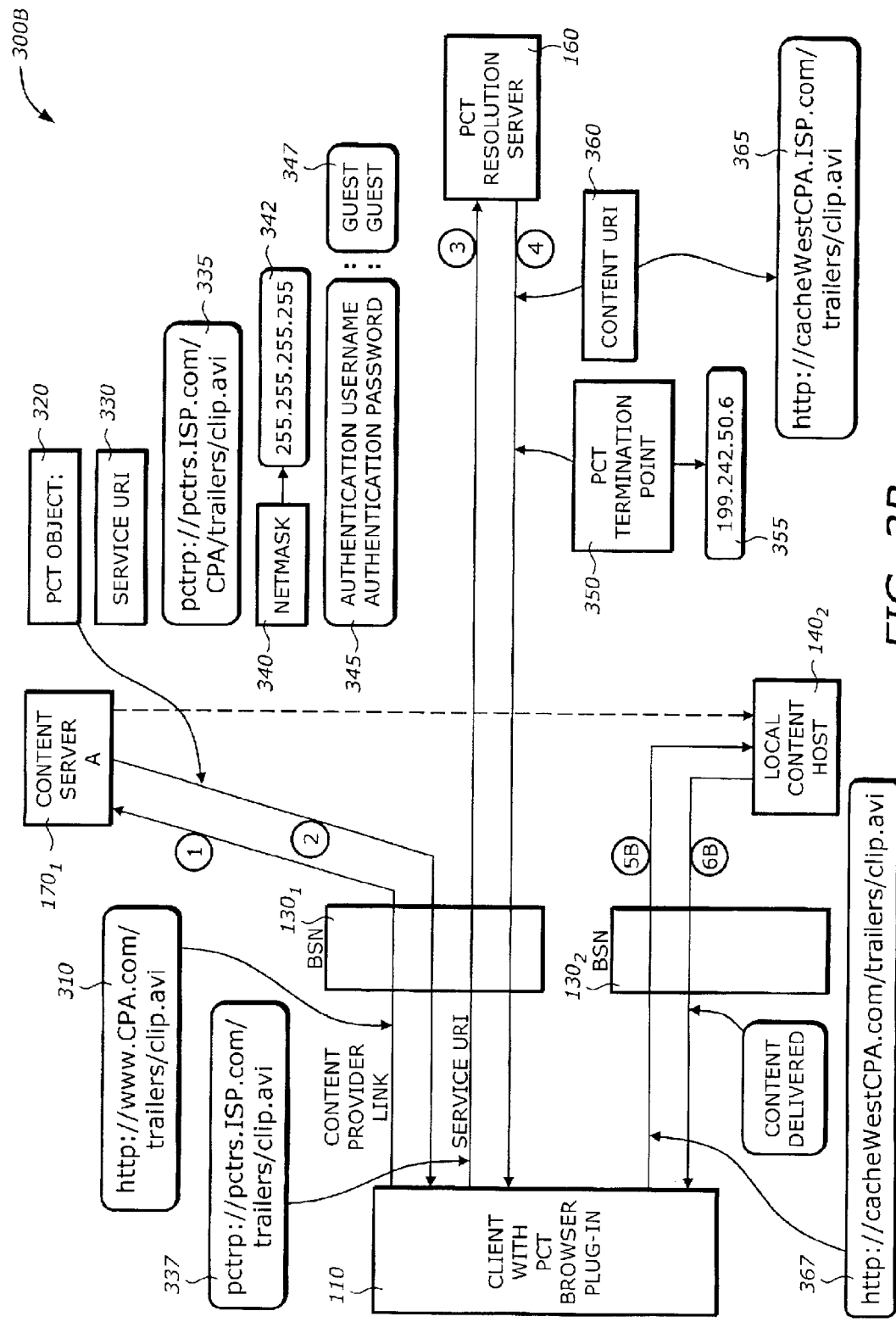
FIG. 3B is a diagram illustrating a PCT protocol for a single replication at local content host according to one embodiment of the invention.

FIG. 3B is a diagram illustrating a PCT protocol for a single replication at a local content host according to one embodiment of the invention. This PCT protocol is similar to that of FIG. 3A except that the local node now contains a second BSN 130₂ with the local content host 140₂. In addition, the PCT object 320 now contains a netmask 340 and an authentication 345 including two parameters username and password.

There are also six steps. Steps 1, 3, and 4 are the same as in FIG. 3A. Steps 2, 5B, and 6B are different as follows:

Step 2: The content server 170₁ returns the PCT object 320 to the client 110 via the BSN 130₁. The PCT object 320 contains PCT information. The PCT information includes a service URI 330, a netmask 340, and authentication information 345. An example of the service URI 330 is a URI 335:

pctrp://pctrs.ISP.com/CPA/trailers/clip.avi

An example of the netmask 340 is a netmask 342:

255.255.255.255

An example of the authentication information 345 is authentication information 347:

Username: Guest
Password: Guest

Step 5B: The client 110 obtains the content URI 360 and uses it as a URI 367 to direct to the local content host 140₁ via the BSN 130₂. In the above example, the content URI 367 is:

http://cacheWestCPA.ISP.com/trailers/clip.avi

Step 6B: The local content host 140₂ stores the content to be delivered. The content may be stored by the content server 170₁. Upon being requested, the local content host 140₂ delivers the stored content to the requesting client 110 via the BSN 130₂.

Figure 3C:
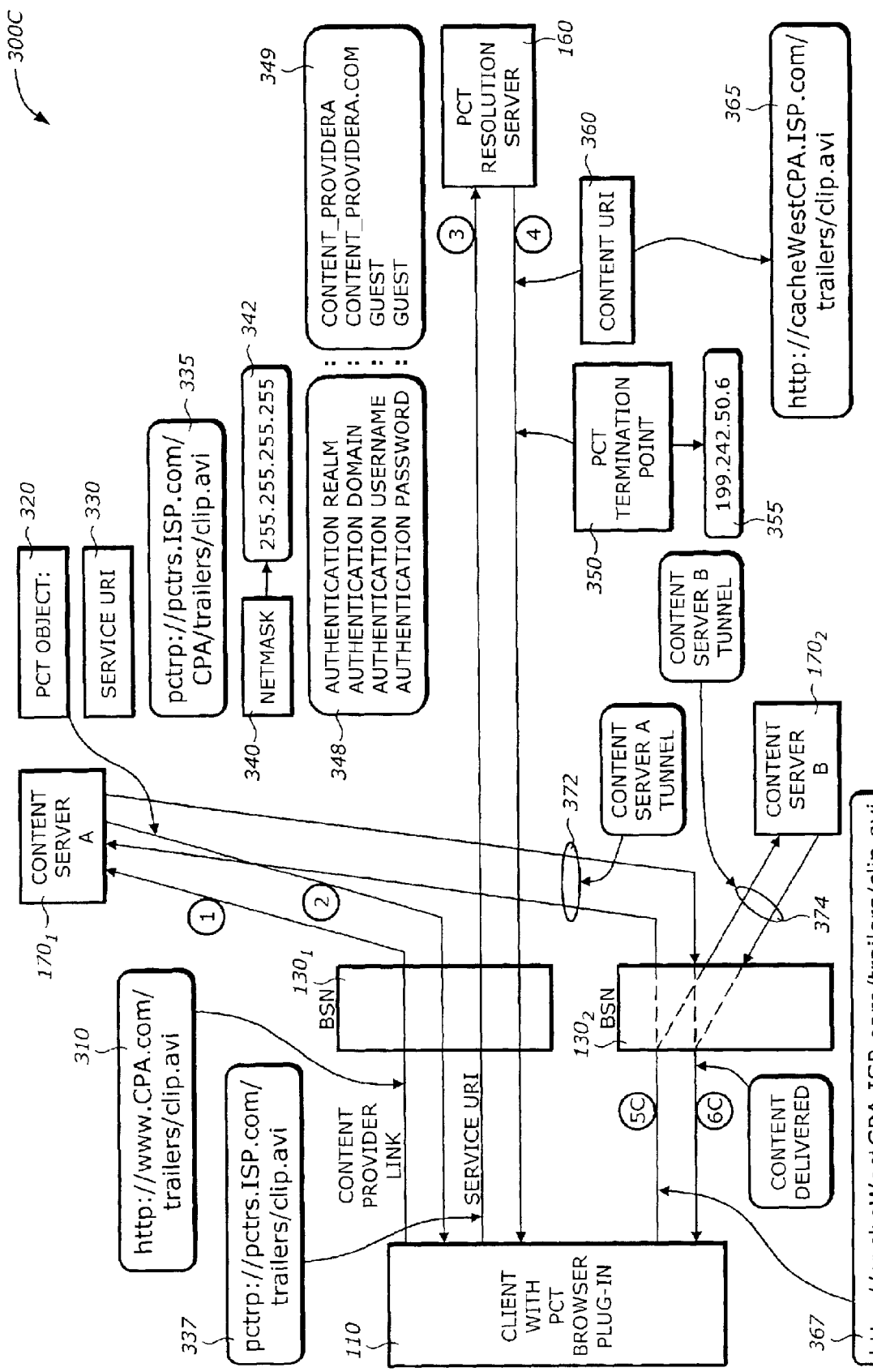
FIG. 3C is a diagram illustrating a PCT protocol for tunnel switching according to one embodiment of the invention.

FIG. 3C is a diagram illustrating a PCT protocol for tunnel switching according to one embodiment of the invention. This PCT protocol is similar to that of FIG. 3B except that the local node contains only a second BSN 130₂ and there are two content server tunnels 372 and 374 connecting the BSN 130₂ to the content servers 170₁ and 170₂, respectively. In addition, the authentication 348 includes two additional parameters: realm and domain.

There are six steps. Steps 1, 2, 3, and 4 are the same as in FIG. 3B except that in step 2, the authentication information includes two additional parameters: realm and domain. An example of the realm parameter is content_provider_A, and example of the domain parameter is content_provider_A.com.

Step 5C: The client 110 obtains the content URI 360 and uses it as a URI 367 to access the local content host 140₁ via the BSN 130₂. In the above example, the content URI 367 is:

http://cacheWestCPA.ISP.com/trailers/clip.avi

At BSN 130₂, the traffic is switched from the PCT to the content server tunnels 372 and 374.

Step 6B: The content servers 170₁ and 170₂ delivers the stored content to the requesting client 110 via the BSN 130₂ through the content provider tunnels 372 and 374, respectively.

Figure 4:
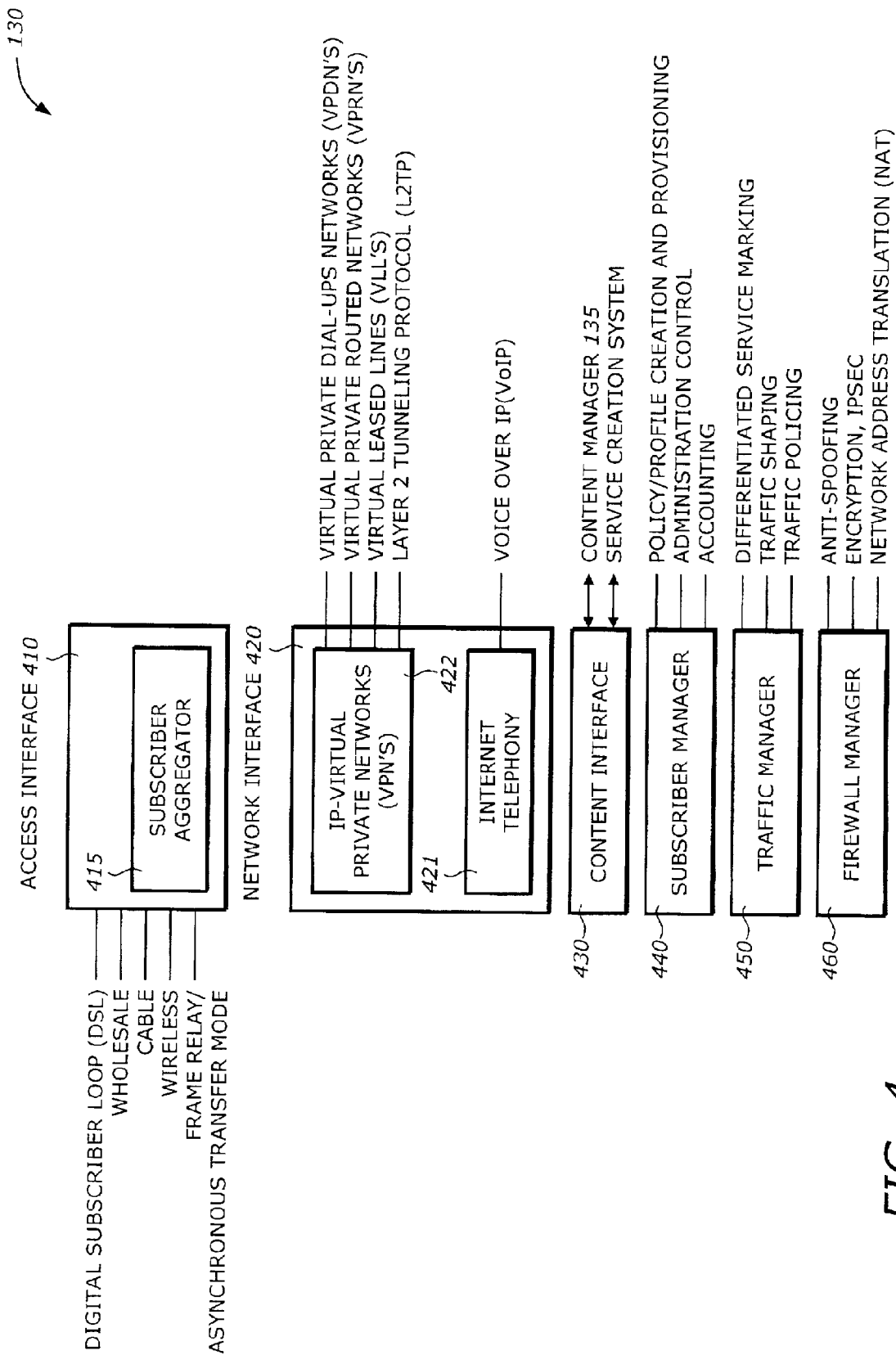
FIG. 4 is a diagram illustrating a service node according to one embodiment of the invention.

FIG. 4 is a diagram illustrating a service node 130 according to one embodiment of the invention. The service node 130 includes an access interface 410, a network interface 420, a content interface 430, a subscriber manager 440, a traffic manager 450, and a firewall manager 460.

The access interface 410 interfaces to a client 110 via the broadband medium 120 (FIG. 1). The client 10 is one of a plurality of subscribers for content delivery via a PCT. The access interface 410 may have interface to an access switch that connects to a number of clients/subscribers. The access interface 410 includes a subscriber aggregator 415 to aggregate the subscribers. The subscriber aggregator 415 allows content providers or service providers to aggregate tens of thousands of subscribers onto one platform and apply highly customized IP services to those subscribers. Subscribers coming into the network across various broadband access technologies such as DSL, cable, and wireless are aggregated and have customized services applied on a per subscriber basis.

The network interface 420 includes a backbone interface to connect to the network 150 (FIG. 1). The backbone interface may include trunks and virtual private networks (VPN). The network interface 410 is coupled to the content server 170 and the PCT resolution server 160 via the network 150 (FIG. 1) to provide the client access to the content delivered by the content server 170 in a content delivery session using a resolution protocol established between the client 10 and the content server 170 and the PCT resolution server 160.

The VPN's emulate a multi-site routed core network, appearing as an IP cloud to edge devices allowing the client 110 to outsource the core routing to the content provider associated with the content server 170. The edge router of the content server 170 appears as a neighbor to the client's routed network, with all VPN tunnels established between these content server routers. The client 110 is therefore relieved from the burden of establishing and maintaining the VPN tunnels.

The content interface 430 is coupled to the content manager 135 (FIG. 1) to manage the content delivery session. The content manager 135 typically has a sophisticated Graphical User's Interface (GUI)-based management system to perform various content management tasks such as content selection and content rating.

The subscriber manager 440 manages service requests from the subscribers. The tasks of the subscriber manager 440 include policy and profile creation and provisioning, administrative control, and accounting. The administrative control may create multiple accounts for each client/subscriber with different permissions on each account based on the user's job function, skill level, experience, and other criteria.

The traffic manager 450 manages traffic over the network 150 according to the service requests. The traffic manager 450 may perform the following tasks: differentiated service (DiffServ) marking, traffic shaping, and traffic policing. In one embodiment, the traffic manager 450 supports the Assured Forwarding (AFP) Per Hop Behavior Group of the IETF Diffserv architecture. DiffServ allows the content or service provider to confidently offer varying levels of service to subscribers and bill accordingly. The traffic manager 450 also identifies IP flows and shapes to an absolute bandwidth and/or a relative bandwidth under times of congestion. Different flows receive different bandwidth allocations. This all occurs on a per-subscriber basis. Traffic policing provides the content/service provider with the ability to define the type and relevant amount of traffic a subscriber can both source and receive. The traffic manager

450 defines types of traffic categories and applies rules as to what happens with excess traffic in these categories. The committed rate, committed burst size, peak rate, and peak burst size thresholds are set with corresponding actions.

The firewall manager 460 prevents unwanted or unauthorized traffic from leaving or entering a subscriber's site. Actions of the firewall manager 460 include anti-spoofing, encryption (IPSec), and Network Address Translation (NAT). Anti-spoofing filters incoming traffic based on the expected source address(es) of the subscriber's link. Encryption capabilities include IPSec and associated key management protocols. NAT permits subscribers to maintain private address spaces for reasons of address management or security, only translating to globally recognized IP address at the service node.

As shown in FIGS. 3A, 3B, and 3C, the service node 130 participates in the initiation of the content delivery session according to the PCT resolution protocol. As shown in step 1 in FIGS. 3A–3C, the resolution protocol includes a link via a hypertext transmission protocol (HTTP) to the content server 170 by the client 10. As shown in step 2 in FIGS. 3A–3C, the resolution protocol includes a transmission of the PCT object 320 from the content server 170 to the client 110 in response to the link. The PCT object contains PCT information to be used to establish the PCT. As shown in steps 3 and 4 in FIGS. 3A–3C, the resolution protocol includes: a resolution of a service uniform resource identifier (URI) using the PCT information to a content URI and a PCT termination point by the PCT resolution server. As shown in steps 5 and 6 of FIGS. 3A–3C, the content is delivered to the client 110 from a local node. The local node may be a local content host 140$_1$ (FIG. 3A), a service node 130$_2$ and a local content host 140$_2$ (FIG. 3B), or a service node 130$_2$ only (FIG. 3C).

The connection between the content server 170 and the client 110 is via the PCT. The PCT is carried over a point-to-point protocol (PPP) session. The PPP session is one of a tunneled carrier and a multi-dialing carrier as discussed earlier.

Other examples of the PCT protocol include LEC providing ISP selection, LEC providing hosted broadband content, and a content provider publishing content on the Web.

1) LEC providing ISP selection:

A LEC can provide web-based ISP selection using PCTs. In the examples below the LEC itself is referred to as ISP_A.

ISP_A (wholesaler) provides customers with 1483/b connections, and DHCP served addresses from the private address space [10.x]. ISP_A's network includes an LNS's capable of L2TP and PPTP tunnel switching to various ISPs based on PPP realm and/or domain name parameters.

Web Page:

ISP_B Logo Link to ISP_B PCT Object

ISP_C Logo Link to ISP_C PCT Object

ISP_B PCT Object:

PCT Service URI: pctrp://pctrs.ISP_A.com/ISP_B/ISP_BHome.html

Netmask=0.0.0.0

PPP authentication realm=ISP_B

PPP authentication domain=ISP_B.com

ISP_C PCT Object:

PCT Service URI: pctrp://pctrs.ISP_A.com/ISP_C/ISP_CHome.html

Netmask=0.0.0.0

PPP authentication realm=ISP_C

PPP authentication domain=ISP_C.net

ISP_A's PCTRS Server is configured to resolve as follows:

PCT Service URI: pctrp://pctrs.ISP_A.com/<path>:

PCT Termination Point: LNS address is derived from client IP address.

For example, if ISP_A were running multiple CONTENT GATEWAYs:

CONTENT GATEWAY 1:

Serves 8000 customers, with addresses given from 10.1.0.0/19

CONTENT GATEWAY 2:

Serves 8000 customers, with addresses given from 10.1.32.0/19

Runs an LNS at address 10.1.32.2 etc.

The LNS address is the 0.2 address within the IP clients/19 subnet.

Content URI: http://hostedHomes.ISP_A.com/<path>

(where <path> is derived from the PCT Service URI above).

All other PCT Server URIs: unresolved.

2) LEC Providing Hosted Broadband Content:

ISP_A provides customers with 1483/b connections, and DHCP served addresses from the private address space [10.x]. ISP_A's network includes an LNS's capable of L2TP and PPTP tunnel switching to various ISP based on PPP realm and/or domain name parameters.

Web Page:

Content_Provider_A Movies

Simba's Pride Link to DisnetMovies.simbasPride PCT Object

Snow White Link to DisnetMovies.snowWhite PCT Object

Content_Provider_B News

Link to Content_Provider_B News PCT Object:

Content_Provider_AMovies.simbasPride PCT Object:

PCT Service URI:

pctrp://pctrs.ISP_A.com/Content_Provider_A/movies/simbasPride.avi

Netmask=255.255.255.255

PPP authentication realm=Content_Provider_A

PPP authentication domain=Content_Provider_A.com

PPP authentication user=guest

PPP authentication password=guest

ISP_A's PCTRS Server is configured to resolve as follows:

PCT Service URI: pctrp://pctrs.ISP_A.com/Content_Provider_A/<path>:

PCT Termination Point: LNS address is derived from client IP address.

For east coast client IP addresses:

Content URI: http://hostedContent_Provider_AEast.ISP_A.com/<path>

For west coast client IP addresses:

Content URI: http://hostedContent_Provider_AWest.ISP_A.com/<path>

(where <path> is derived from the PCT Service URI above).

3) Content Provider publishing Content on the Web:

A Content Provider can publish content using PCT Objects on the web. Such objects can then be displayed by any Internet connected web browser (with PCT Object plug-in installed). However, when viewed from networks that have peering or hosting relationships with the content provider, optimized paths to the content will be taken.

This capability allows Content Providers to publish globally accessible data once, and in a single format, and to separately [and centrally] handle the network path optimization issues via PCT Resolution Server setups.

Web Page:
Content_Provider_A Movies
Simba's Pride Link to DisnetMovies.simbasPride PCT Object
Snow White Link to DisnetMovies.snowWhite PCT Object
Content_Provider_AMovies.simbasPride PCT Object:
PCT Service URI:
pctrp://pctrs. Content_Provider_A.com/Content_Provider_A/movies/simbasPride.avi
Netmask=255.255.255.255
PPP authentication realm=Content_Provider_A
PPP authentication domain=Content_Provider_A.com
PPP authentication user=guest
PPP authentication password=guest Content_Provider_A's PCT Resolution Servers can be configured with knowledge of PCT Termination Points for various address spaces. For address spaces for which optimized PCT Termination Point paths do not exist, the Content_Provider_A PCT Resolution Servers can return an IP carrier technology resolution response.

By establishing Peering and hosting agreements with various ISPs and LECs, Content_Provider_A can optimize delivery of its globally available content over certain networks.

In the above example, the PCT Client would query the Content_Provider_A PCTRS Server with the following request:

RESOLVE 54321 L2TP 199.242.48.30
pctrp://pctrs.Content_Provider_A.com/Content_Provider_A/movies/simbasPride.avi If the Client (199.242.48.30) is in a network that the content provider has no known agreements with, the server will respond with:

RESOLVED 54321 IP 199.242.48.30
http://www.Content_Provider_A.com/Content_Provider_A/movies/simbasPride.avi.

However, if the Client (199.242.48.30) is in a network with a PCT hosting setup, the server could respond with:

RESOLVED 54321 L2TP 199.242.50.6
http://hostedContent_Provider_A.coolIsp.com/Content_Provider_A/movies/simbasPride.avi While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A browser plug-in comprising:
    a Personal-Content Tunnel (PCT) object processor to process a PCT object (PCTO) returned by a content server in response to a request from a client, the PCTO containing PCT information;
    PCT resolution module coupled to the PCT object processor to resolve a service uniform resource identifier (URI) using the PCT information according to a PCT resolution protocol, the service URI identifying a PCT resolution server;
    a server interface to receive a content URI and a PCT termination point resolved by the PCT resolution server; and
    a session initiator to initiate a content delivery session between the client and a local node using a carrier tunnel identified by a carrier type identifier, the local node providing access to a content delivered from the content server;
    wherein the local node is one of a first local content host and a broadband service node, the first local content host caching the content, the broadband service node connecting to one of a second local content host caching the content and the content server via a content server tunnel.

2. The browser plug-in of claim 1 wherein the PCT information includes at least one of a carrier type identifier, a PCT routing control parameter, a PCT session time-out parameter, a bandwidth parameter, an authentication parameter, and the service URI.

3. The browser plug-in of claim 2 further comprises:
    an authenticator to authenticate the client using the authentication parameter, the authentication parameter being one of a realm, a domain, a username, and a password.

4. The browser plug-in of claim 1 wherein the PCT object processor comprises:
    a PCT object receiver to receive the PCT object via a Hypertext Transfer Protocol (HTTP) link; and
    a PCT object interpreter to interpret the received PCT object.

5. The browser plug-in of claim 4 wherein the PCT object interpreter comprises:
    a PCT object identifier to identify the PCT object based on a unique encoding type.

6. The browser plug-in of claim 5 wherein the unique encoding type is the Multipurpose Internet Mail Extensions (MIME).

7. The browser plug-in of claim 1 wherein the carrier tunnel uses a tunneling protocol, the tunneling protocol being one of a point-to-point protocol (PPP)/layer two tunneling protocol (L2TP) and a PPP/point-to-point tunneling protocol (PPTP).

8. The browser plug-in of claim 1 further comprises:
    a routing controller to establish a route for the content delivery session between the client and the subnet containing the Internet Protocol (IP) address of the content server, the subnet being identified by a network mask in the PCT routing control parameter.

9. A method comprising:
    processing a PCT object (PCTO) returned by a content server in response to a request from a client, the PCTO containing PCT information;
    resolving a service uniform resource identifier (URI) using the PCT information according to a PCT resolution protocol, the service URI identifying a PCT resolution server;
    receiving a content URI and a PCT termination point resolved by the PCT resolution server; and
    initiating a content delivery session between the client and a local node using a carrier tunnel identified by a carrier type identifier, the local node providing access to a content delivered from the content server;
    wherein the local node is one of a first local content host and a broadband service node, the first local content host caching the content, the broadband service node connecting to one of a second local content host caching the content and the content server via a content server tunnel.

10. The method of claim 9 wherein the PCT information includes at least one of a carrier type identifier, a PCT routing control parameter, a PCT session time-out parameter, a bandwidth parameter, an authentication parameter, and the service URI.

11. The method of claim 10 further comprises:
authenticating the client using the authentication parameter, the authentication parameter being one of a realm, a domain, a username, and a password.

12. The method of claim 9 wherein processing the PCT object comprises:
receiving the PCT object via a Hypertext Transfer Protocol (HTTP) link; and
interpreting the received PCT object.

13. The method of claim 12 wherein interpreting the received PCT object comprises:
identifying the PCT object based on a unique encoding type.

14. The method of claim 13 wherein the unique encoding type is the Multipurpose Internet Mail Extensions (MIME).

15. The method of claim 9 wherein the carrier tunnel uses a tunneling protocol, the tunneling protocol being one of a point-to-point protocol (PPP)/layer two tunneling protocol (L2TP) and a PPP/point-to-point tunneling protocol (PPTP).

16. The method of claim 9 further comprises:
establishing a route for the content delivery session between the client and the subnet containing the Internet Protocol (IP) address of the content server, the subnet being identified by a network mask in the PCT routing control parameter.

17. A computer program product comprising:
a machine useable medium having computer program code embedded therein, the computer program product having;
computer readable program code to process a PCT object (PCTO) returned by a content server in response to a request from a client, the PCTO containing PCT information;
computer readable program code to resolve a service uniform resource identifier (URI) using the PCT information according to a PCT resolution Protocol, the service URI identifying a PCT resolution server;
computer readable program code to receive a content URI and a PCT termination point resolved by the PCT resolution server; and
computer readable program code to initiate a content delivery session between the client and a local node using a carrier tunnel identified by a carrier type identifier, the local node providing access to a content delivered from the content server;
wherein the local node is one of a first local content host and a broadband service node, the first local content host caching the content, the broadband service node connecting to one of a second local content host caching the content and the content server via a content server tunnel.

18. The computer program product of claim 17 wherein the PCT information includes at least one of a carrier type identifier, a PCT routing control parameter, a PCT session time-out parameter, a bandwidth parameter, an authentication parameter, and the service URI.

19. The computer program product of claim 17 wherein the carrier tunnel uses a tunneling protocol, the tunneling protocol being one of a point-to-point protocol (PPP)/layer two tunneling protocol (L2TP) and a PPP/point-to-point tunneling protocol (PPTP).

20. A system comprising:
a content server coupled to a network to provide a content;
a PCT resolution server coupled to the network to that resolves a service uniform resource identifier (URI) using PCT information to a content uniform resource identifier (URI) and a PCT termination point; and
a client coupled to a first broadband service node via a broadband medium, the first broadband service node coupling to the network, the client having a browser interfacing to a browser plug-in, the browser plug-in comprising:
a Personal Content Tunnel (PCT) object processor to process a PCT object (PCTO) returned by the content server in response to a client request from the client, the PCTO containing PCT information,
a PCT resolution module coupled to the PCT object processor to resolve a service uniform resource identifier (URI) using the PCT information according to a PCT resolution protocol, the service URI identifying the PCT resolution server,
a server interface to receive the content URI and the PCT termination point resolved by the PCT resolution server, and
a session initiator to initiate a content delivery session between the client and a local node using a carrier tunnel identified by a carrier type identifier, the local node providing access to the content delivered from the content server.

21. The system of claim 20 wherein the PCT information includes at least one of a carrier type identifier, a PCT routing control parameter, a PCT session time-out parameter, a bandwidth parameter, an authentication parameter, and the service URI.

22. The system of claim 20 wherein the local node is one of a first local content host and a second broadband service node, the first local content host caching the content, the second broadband service node connecting to one of a second local content host caching the content and the content server via a content server tunnel.

23. The system of claim 22 wherein the carrier tunnel uses a tunneling protocol, the tunneling protocol being one of a point-to-point protocol (PPP)/layer two tunneling protocol (L2TP) and a PPP/point-to-point tunneling protocol (PPTP).

* * * * *